United States Patent [19]

Blair

[11] 3,711,190

[45] Jan. 16, 1973

[54] FLOAT FOR SPECTACLES

[75] Inventor: Benton Blair, Sanibel, Fla.

[73] Assignee: Farnham Blair, Alexandria, Va. ; a part interest

[22] Filed: July 19, 1971

[21] Appl. No.: 163,928

[52] U.S. Cl. ...............................................351/43
[51] Int. Cl. ..............................................G02c 1/00
[58] Field of Search .........351/43, 157, 158; 9/8, 311

[56] References Cited

UNITED STATES PATENTS

| | | |
|---|---|---|
| 3,016,796 | 1/1962 | Boothe.................................351/43 |
| 3,038,375 | 6/1962 | Gansz....................................351/43 |
| 1,999,702 | 4/1935 | Lafond et al. .......................351/43 X |

*Primary Examiner*—David Schonberg
*Assistant Examiner*—Robert L. Sherman

[57] ABSTRACT

A float for spectacles including a blow molded air cell made of a resilient plastic material and having a pair of integral molded loops at its opposite ends. These loops, when threaded onto the temple of a pair of spectacles, are bent out of the plane in which they are molded and resiliently press against the inside of the temple to hold the air cell in mounted position thereon.

2 Claims, 5 Drawing Figures

PATENTED JAN 16 1973  3,711,190

INVENTOR
BENTON BLAIR

FLOAT FOR SPECTACLES

BACKGROUND OF THE INVENTION

A great many people who engage in sports such as fishing and sailing wear eyeglasses. If they accidentally drop their eyeglasses in the water, they are usually lost, resulting in considerable expense and inconvenience to the wearer. It is the object of this invention to provide an inexpensive float for eyeglasses which may be easily and quickly mounted on the temple and which will float the eyeglasses in water. Other objects will be apparent from the description below and/or the accompanying drawing.

DESCRIPTION OF THE ENCLOSED EMBODIMENT

Figure 1:
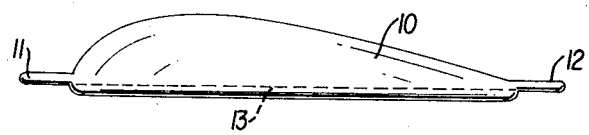
FIG. 1 is a side elevation of an embodiment of a float according to the present invention.
Figure 2:
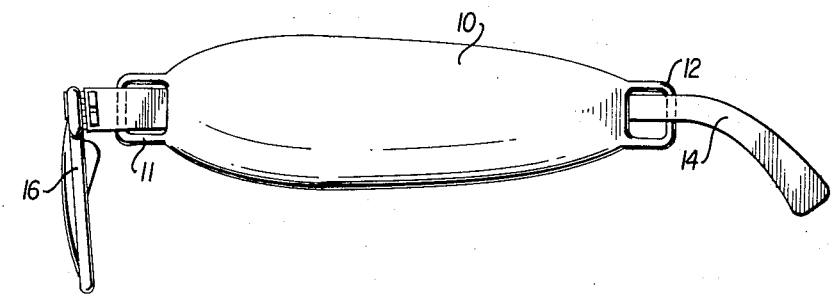
FIG. 2 is a top plan view of a float mounted on the temple of an eyeglass frame.

Referring now to the drawings and to FIG. 1 in particular, there is shown an air cell which has a pair of integral loops 11 and 12 formed at its opposite ends. The air cell and loops are blow molded from a resilient plastic material. The wall thickness of the air cell is very thin keeping the weight of the float at a minimum so that a pair of floats may be worn with maximum comfort.

Figure 3:
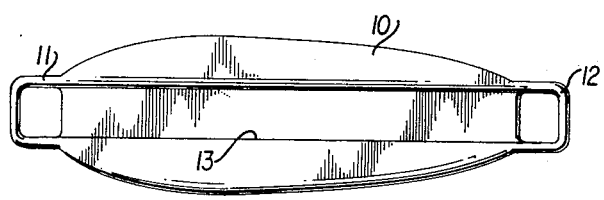
FIG. 3 is a bottom plan view of the float.
Figure 4:
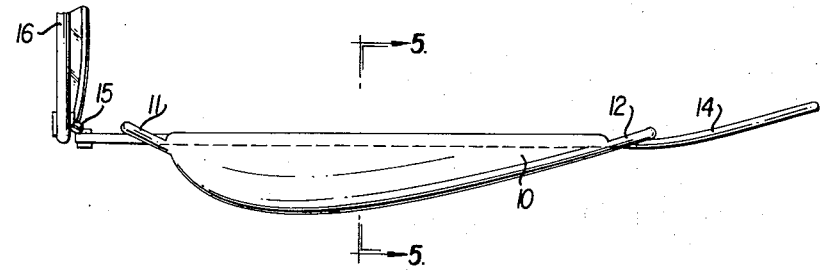
FIG. 4 is a side elevation of the float mounted on the temple of an eyeglass frame.
Figure 5:
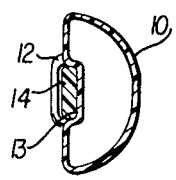
FIG. 5 is a vertical section taken on the line 5—5 of FIG. 4.

Referring to FIGS. 3 and 5, it will be noted that a channel 13 is formed in the bottom of the float and extends lengthwise of it between end loops 11 and 12. End loops are formed in planes substantially parallel to the bottom of the channel so that when threaded on a temple they are bent out of the planes in which they normally lie and resiliently press the temple into channel 13. Thus loops 11 and 12 hold the float in mounted position on the temple.

The temple shown is of the plastic library type hingedly connected by hinge 15 to a spectacle front 16. It should be noted that the float may be mounted on any type of temple and that loops 11 and 12 are so positioned with respect to channel 13 that they will resiliently press against the inside of any temple on which they are threaded.

In use, a pair of floats are mounted on the temples of a pair of spectacles although a single float may be used on a light frame. By blow molding the air cell and the loops as an integral complete unit, unit cost is kept at a minimum and the correct position of loops 11 and 12 with respect to the air cell is assured.

As various possible embodiments may be made of this inventive concept, and as many modifications may be made of the embodiment hereinbefore shown and described, it is to be understood that all matter herein is to be interpreted merely as illustrative and not in a limiting sense.

I claim:

1. In a float for a pair of spectacles blow molded as an integral unit from a flexible plastic material, the combination of an air cell having a thin plastic wall and a pair of loops integrally formed on the ends of said air cell, said loops being resilient and lying generally in the plane of the float and being bent out of said plane when threaded onto the temple of a pair of spectacles, whereby they resiliently engage the inside of the temple to hold the air cell in mounted position on the temple.

2. In a blow molded float according to claim 1, in which a channel extends longitudinally of the air cell, said loops when threaded on a temple resiliently pressing the temple against the bottom of the channel.

* * * * *